United States Patent
Heinlein et al.

(10) Patent No.: US 12,537,707 B2
(45) Date of Patent: Jan. 27, 2026

(54) SORTING METHOD FOR SORTING A PARTICIPANT LIST COMPRISING PARTICIPANTS OF A VIDEO CONFERENCE

(71) Applicant: Heinlein Support GmbH, Berlin (DE)

(72) Inventors: Peer Heinlein, Berlin (DE); Dennis Kalbhen, Potsdam (DE); Frederik Schwan, Darmstadt (DE)

(73) Assignee: Heinlein Support GmbH, Berlin (DE)

( * ) Notice: Subject to any disclaimer, the term of this patent is extended or adjusted under 35 U.S.C. 154(b) by 0 days.

(21) Appl. No.: 18/705,562

(22) PCT Filed: Oct. 27, 2022

(86) PCT No.: PCT/DE2022/200247
§ 371 (c)(1),
(2) Date: Apr. 28, 2024

(87) PCT Pub. No.: WO2023/072350
PCT Pub. Date: May 4, 2023

(65) Prior Publication Data
US 2025/0132940 A1    Apr. 24, 2025

(30) Foreign Application Priority Data
Oct. 28, 2021   (DE) .................. 10 2021 212 196.9

(51) Int. Cl.
*G06F 15/16*    (2006.01)
*H04L 12/18*    (2006.01)
*H04N 7/15*    (2006.01)

(52) U.S. Cl.
CPC ........... *H04L 12/1822* (2013.01); *H04N 7/15* (2013.01)

(58) Field of Classification Search
CPC .............................. H04L 12/1822; H04N 7/15
See application file for complete search history.

(56) References Cited

U.S. PATENT DOCUMENTS

| | | | |
|---|---|---|---|
| 2004/0047461 A1* | 3/2004 | Weisman | H04M 3/567 379/202.01 |
| 2012/0182384 A1* | 7/2012 | Anderson | H04N 7/157 348/14.09 |

(Continued)

FOREIGN PATENT DOCUMENTS

CN    109819195    5/2019

OTHER PUBLICATIONS

Internationaler Recherchenbericht und Schriftlicher Bescheid [International Search Report and the Written Opinion] Dated Feb. 7, 2023 From the International Searching Authority Re. Application No. PCT/DE2022/200247 and its Translation of Search Report Into English. (12 Pages).

*Primary Examiner* — Duyen M Doan (57) ABSTRACT

The present invention relates to a sorting method for sorting a participant list (PL) comprising participants (P) of a video conference (VC), having the following steps:
  detecting all of the participants (P) of the video conference (VC),
  detecting at least one participant attribute (PAT) for each detected participant (P),
  generating a participant list (PL) of all of the detected participants (P),
  sorting the participant list (PL) on the basis of the detected participant attributes (PAT),
  fixing the sorted participant list (PL) at least for a fixing duration (FD) over the further course of the video conference (VC).

18 Claims, 9 Drawing Sheets

(56) References Cited

U.S. PATENT DOCUMENTS

| | | | |
|---|---|---|---|
| 2014/0372941 A1* | 12/2014 | Parsons | H04L 12/1827 |
| | | | 715/810 |
| 2017/0302466 A1* | 10/2017 | Stoner | H04L 12/1822 |
| 2018/0197152 A1* | 7/2018 | Mendes | G06Q 10/1093 |
| 2018/0375676 A1 | 12/2018 | Bader-Natal et al. | |
| 2020/0193389 A1* | 6/2020 | Lagares-Greenblatt | |
| | | | G06Q 10/063114 |
| 2021/0037068 A1* | 2/2021 | Shelke | H04L 65/1096 |

* cited by examiner

SORTING METHOD FOR SORTING A PARTICIPANT LIST COMPRISING PARTICIPANTS OF A VIDEO CONFERENCE

RELATED APPLICATIONS

This application is a National Phase of PCT Patent Application No. PCT/DE2022/200247 having International filing date of Oct. 27, 2022, which claims the benefit of priority of Germany Patent Application No. 10 2021 212 196.9 filed on Oct. 28, 2021. The contents of the above applications are all incorporated by reference as if fully set forth herein in their entirety.

FIELD AND BACKGROUND OF THE INVENTION

The present invention relates to a sorting method for sorting a participant list comprising participants of a video conference as well as a computer program product for carrying out such a method.

It is known for video conferences to be conducted on participant devices, with numerous individual participants. In order to improve clarity, such video conferences are often equipped with a display of participant lists on display devices of the participant device. The participant list is usually variable and is compiled automatically, usually following an alphabetical sorting of the display names of the participants.

A disadvantage of the known solutions is that a high degree of moderation is required, in particular in conferences with numerous participants who are all supposed to speak one after the other. While in real conferences an order of speakers was usually predetermined automatically, and above all visibly, for example by the seating arrangement in a room or at a conference table, this is no longer the case with video conferencing systems. The fact that the participant list is often not only compiled randomly, but can also change again over the course of the video conference, for example through the addition or removal of individual participants, means that such a visual order for the individual participants is not provided by the known participant lists of the video conferences. Also, some solutions dynamically sort participants with a speaker role, switched-on microphone and/or image to higher positions. This leads to one of the participants having to take on a moderator function and manually select individual participants and instruct them to take their turn with their spoken contribution. The order of the individual speakers is therefore manually specified and moderated by the moderator. In addition to the effort involved in moderation, an effort in terms of preparation is necessary here. In addition, the moderation itself will take time, so that such manually moderated video conferences take correspondingly longer.

It is the object of the present invention to remedy, at least in part, the disadvantages described above. In particular, it is the object of the present invention to simplify the moderation of large groups for a video conference in a cost-effective and simple way.

SUMMARY OF THE INVENTION

The above object is achieved by a sorting method with the features of claim 1 and a computer program product with the features of claim 17. Further features and details of the invention are disclosed in the dependent claims, the description and the drawings. Naturally, features and details described in connection with the sorting method according to the invention also apply in connection with the computer program product according to the invention and vice versa, so that with regard to disclosure mutual reference is or can always be made to the individual aspects of the invention.

According to the invention, a sorting method for sorting a participant list comprising participants of a video conference is suggested. Such a sorting method has the following steps:

detecting all of the participants of the video conference,
detecting at least one participant attribute for each detected participant,
generating a participant list all of the detected participants,
sorting the participant list on the basis of the detected participant attributes,
fixing the sorted participant list at least for a fixing duration over the further course of the video conference.

A sorting method according to the invention can be carried out on participant devices, but also on server devices or central control units which are made available for a video conference. For example, such a video conference runs on numerous participant devices such as tablet computers, laptops or PCs. A central control unit, for example server-based, can be provided to control the video conferencing system. Thus, a sorting method according to the invention can be carried out both decentrally on the individual participant devices, but also on a central computer.

As in the case of known video conferencing systems, in a sorting method according to the invention a plurality of participants are detected as such and integrated into a participant list. In addition, however, at least one participant attribute of each detected participant is detected. Possibilities for participant attributes will be explained in more detail later. For example, this can be a seat number, a role of the respective participant, their function within the company or the like. Of course, it is also possible to detect two or more participant attributes for each detected participant. It is also advantageous if an identical participant attribute, that is to say a participant attribute of the same type, is detected for each detected participant.

The fact that at least one participant attribute is also detected for each detected participant makes it possible to sort the participant list based on these detected participant attributes. This sorting means that the participant list can be brought into a defined order, for example regardless of the time of joining the video conference. An essential part of the sorting method according to the invention is that, in the final step, the sorted participant list is fixed, at least for a fixing duration over the further course of the video conference. The fixing duration is a period of time over which the sorting of the participant list and thus the order of the participants in this sorted participant list does not change. This can also be described as "freezing" the sorted participant list. If the sorted participant list is fixed in this way, changing participant attributes, removing or adding participants can also have no effect on the sorting. Of course, however, the fixation can be temporarily suspended if, as will be explained later, new participants join later or participants leave the video conference again.

In contrast to previously known solutions for video conferences, the participant lists are thus sorted in a defined way and then fixed at least over a fixing duration. This means that the order of the participants, as they are sorted in the participant list, remains fixed by the fixation and does not change over the further course of the video conference, at least over the course of the fixing duration.

With regard to the problem described above, this means that the moderation of the individual participants is now significantly simplified. If the video conference is for example intended to allow the individual participants to provide each other with an update on a project, for example in the form of a weekly project meeting, the participants can now deliver their spoken contributions in the order of the fixed, sorted participant list. This can be organised by the individual participants themselves, so that the participants orient themselves according to the order of the fixed and sorted participant list and, accordingly, participate in the video conference and actively speak according to the order determined in this way. However, it is also possible for moderation to take place on the basis of the fixed and sorted participant list. Whereas, in previous solutions, a moderator had to manually monitor who has already spoken and which participants have yet to speak, in a sorting method according to the invention they can refer to a sorted and fixed participant list. In addition to the self-organisation of the individual participants on the basis of the sorted and fixed participant list described above, a moderated version is also simplified here, since the moderator can refer to the fixed order in the sorted participant list.

The fixing duration can for example be as long as the video conference itself, but it can also be shorter. If, for example, the video conference is scheduled as a project meeting, the first part of this project meeting can consist of a status update by the individual project members as participants of the video conference. The sorting method according to the invention is used for this update and the fixing duration is maintained until each participant has presented their update in the video conference in the form of their spoken contribution according to the sorted order in the fixed participant list. Following the end of the fixing duration, the video conference can be continued openly in a known manner without this having had any influence on the previous fixing duration.

It should also be noted that a video conference within the context of the present invention is of course also to be understood to include other participant device-based conferencing solutions. In particular, these can also be conferences which consist of a combination of video signals and audio signals. A conference which is based exclusively or substantially exclusively on audio signals of the individual participants can be equipped here with a sorting functionality according to the invention by outputting these on the participant devices.

It can be advantageous if, in a sorting method according to the invention, if new participants are detected after the sorted participant list has been fixed, these new participants are added to the sorted participant list at the end, after the time of joining, and the supplemented participant list is fixed again at least for the fixing duration. It is not uncommon for participants to join a video conference late. In such a case, in order not to have to run through the whole sorting method afresh, and in particular to avoid changing the order of the meeting which has already started, in this case the late participants are added as new participants at the end of the participant list according to the later time of joining, and then the fixation is reactivated. The renewed fixing following the addition means that the previous order is retained and a supplementation takes place exclusively through the addition of the new participants. This step of the sorting method according to the invention thus opens the participant list for the addition of the new participant, but without changing the sorted order, and is then fixed again.

In addition, or alternatively, in a sorting method according to the invention, if new participants are detected after the sorted participant list has been fixed, it is possible that these new participants of the sorted participant list are sorted into the sorted participant list on the basis of their detected at least one participant attribute, and the supplemented participant list is fixed again at least for the fixing duration. This can be done in addition to or as an alternative to the previous paragraph. For example, it is possible that the same participant attributes are applied as was the case during the initial sorting when the sorting method was first performed. This also makes it possible to sort newly added participants into the participant list. In particular, this is desirable if, in the nature of things, these would in any case have been sorted into the participant list at such a late position that they would not yet have had their turn to speak in the course of the moderation. Alternatively, it may be preferable if the new participants as such are, following their addition, marked in the participant list as new participants, so that a visual recognition of the newly added participants can be maintained when the order is changed through the addition. It is preferable if, in addition, it is also checked here whether, or at what point in the current order, the active participant (explained later) is arranged, i.e. whether, in the position intended for them, the newly added participant would have to be sorted later in the order, after the active participant, or before the position of the currently active participant.

It should also be noted that participants can of course also withdraw from the video conference. This can be the case before they have spoken, but also after they have spoken. In both cases, it is possible to temporarily suspend the fixation and remove the withdrawn participant from the participant list without changing the order of the remaining participants.

It is also advantageous if, in a sorting method according to the invention, in the sorted and fixed participant list, at least one participant, in particular always only exactly one participant, is successively marked as active participant, wherein the order of marking as active participant corresponds to the sorted and fixed participant list. This can also be referred to as automatic moderation, so that the sorting method not only performs the sorting, but also the moderation, and marks the individual participants successively as active according to the order of the sorted and fixed participant list. An active participant is a participant who currently has the task of speaking in the video conference, for example providing an update on their part in a project. Different activity criteria can be applied here. In the simplest case, the marking can be a pointer or a visual highlight on a participant device. Further interventions in the respective participant device and/or the video conferencing system are also conceivable. For example, by marking an active participant, they can be automatically set to loud, so that their microphone signals are transmitted to the other participants in the video conference. This can also be referred to as auto-unmute. Alternatively, the respective participant can be actively requested, in a low-threshold manner, to switch on their microphone. Other visual representations, such as borders around the respective participant or the highlighting of the respective speaker in the video conference solution, are also fundamentally possible here. The active participant will speak as such and at the end of their marking time will hand over the activity to another participant. This means that another participant, namely the one who follows the previous active participant in the order of the sorted and fixed participant list, is now marked as the active participant and takes over the speaker role, so to speak, from the previous active participant. It can clearly be seen here that, by fixing the sorted participant list, not only is it possible to facilitate manual moderation or allow self-organisation of the participants; a function is actually made available which works through this order in a fully automated manner.

Further advantages can be achieved if, in a sorting method according to the invention, in the sorted and fixed participant list, one participant is marked as follow-up participant after the marked active participant. Since the order is fixed due to the fixing of the sorted participant list, it is possible to predict in a defined manner which participant will follow the currently marked active participant as the next active participant. By marking this next participant as follow-up participant, they can be made aware, by visual and/or acoustic means, for example on their participant device, that they are next in line to actively engage in the video conference. This marking is visible in particular to the follow-up participant. However, it can also be advantageous if the marking as follow-up participant is also accessible to the other participants of the video conference and displayed to them. Of course, several follow-up participants, i.e. a first follow-up participant, a second follow-up participant, a third follow-up participant, can also be displayed on the participant devices next to a visual representation of a participant list in order to emphasise the order even more clearly for the individual participants.

It is also advantageous if, in a sorting method according to the invention, together with the marking as active participant, the audio transmission for this active participant is activated. This has already been briefly explained with regard to an auto-unmute functionality. In other words, a participant is marked as active and simultaneously or subsequently activated for an audio transmission. In video conferences, a large number of participants will usually switch off their microphone for better clarity and intelligibility, i.e. they will be in an audio mute function. The fact that a participant is now marked as active makes it clear that they should participate in the video conference actively, in particular through speech content. The automatic activation of the audio transmission together with the marking leads to a further facilitation of moderation, in particular in an automatic manner, for the video conferencing system. Passing the marking from an active participant to a next active participant leads in particular to the participant who is no longer marked as active stopping their audio transmission again, or this audio transmission is automatically stopped for them; this can also be referred to as auto-mute.

It is also advantageous if, in a sorting method according to the invention, before being marked as active participant, the participant to be marked receives a marking query. Given that an active participant is brought visually and/or acoustically to the forefront in the video conference, it can be advantageous if consent to this marking is obtained in advance. Such a marking query can for example be sent to the respective participant when marking them as a follow-up participant. This must either be answered, or a marking as active participant takes place if the marking query is not rejected within a defined query time. This ensures that the highlighting of the respective participant as active participant only takes place with their awareness and also, in particular, with their consent in the video conference.

It is also advantageous if, in a sorting method according to the invention, if new participants are detected after the sorted participant list has been fixed and after the marking of the active participants has begun, these new participants of the sorted participant list are sorted into the sorted participant list on the basis of their detected at least one participant attribute if the corresponding sorting position is arranged after the position of the active participant at the time of supplementation, and the supplemented participant list is then fixed again at least for the fixing duration. As has been explained above, it is possible that new participants may join after the video conference has begun. In order not to impair the sorting and fixing functionality according to the invention, in this embodiment these are then sorted into the participant list according to the detected participant attributes. However, since it must be ensured that, for example in the case of an update in a project meeting, all participants can also provide their spoken contribution, in this embodiment it is checked whether the sorting into the list would lead to this new participant being passed over. This would be the case if the new participants were to be sorted into the participant list, on the basis of their participant attribute, at a position that would actually have already had its turn over the course of the defined order of the participant list. If a sorting into this position before the active participant were to take place, this would lead to this new participant being passed over. Only if the sorting position for the new participant is arranged after the currently active participant does a corresponding sorting into the participant list based on the participant attribute take place. In the contrary case, this new participant can for example simply be placed at the end of the participant list. It may also be desirable that in such a case the participant, who would actually have already had their turn according to the previous order, is now directly sorted in as follow-up participant due to their late joining.

Further advantages can be achieved if, in a sorting method according to the invention, the marking of the active participant includes a continuous time display. Such a continuous time display can for example represent the total meeting time of the video conference. Counters are also possible which count down the speaking time of the respective participant or the total time of the respective meeting. Of course, negative counters are also conceivable if individual active participants were not able to complete their current spoken contribution in the allotted time, but have exceeded this. Such time displays can be displayed, separately, only to the respective participants, but can also be made available to all participants in the video conference. This takes place in particular on the participant devices of the individual participants.

It is also advantageous if, in a sorting method according to the invention, after the end of the marking of an active participant, they are marked as a concluded participant. Similar to a playlist in a music program, each participant can thus be understood here, with their spoken contribution, as a single track in such a playlist.

The automoderation which has already been mentioned several times leads to the individual tracks, in the form of the participants, being activated, i.e. "played". The playback thus corresponds to the spoken contribution of the respective participant. As soon as they have completed their spoken contribution, this participant is considered to have been played and accordingly no longer active, since they have concluded their participation in this part of the video conference. This means that a marking is recognisable, for example visually, in the participant list, so that the individual participants can have a different status. These can be open participants who have not yet delivered their spoken contribution, an active participant who is currently actively delivering their spoken contribution and concluded participants who have already been previously marked as active participants.

It is also advantageous if, in a sorting method according to the invention, at least one control signal is detected, wherein, in particular on the basis of a detected control signal in the form of a pause signal, the marking of the next active participant is blocked, in particular until a control signal in the form of a start signal is detected. While the order in the fixed and sorted participant list can fundamentally be worked through automatically, a manual intervention can also be provided. On the one hand, this can involve the provision of a start signal as a control signal to start the automoderation or to start it again after a pause. For example, corresponding buttons can be displayed by the sorting method on a display device of the respective participant device in order to be able to detect such a control signal. Since an automatic process can lead to a pause within the video conference being postponed, a manual pausing of the video conference and in particular of this automoderation is also advantageous. This can for example be provided by a corresponding pause button, so that in this way, by clicking on this button on the participant device, the pause can, as a control signal, lead to a pausing of the automoderation. Of course, however, automatic signals, for example an automatic pause after one hour, can also be implemented within the scope of the present invention.

It brings further advantages if, in a sorting method according to the invention, the active participants are assigned different audio parameters based on their order in the sorted and fixed participant list. For example, from an acoustic point of view, a seating arrangement can be replicated in this way. If the individual participants have the technical means, with their participant devices, to enable a spatial assignment of audio signals, the individual participants can, on their activation, replicate the order according to the seating arrangement, for example they can move from left to right with regard to their audio signals. For each participant device and each participant, this means that not only does the order become clear in a visual or marked manner, but the order from left to right is also evident in acoustic terms.

In addition, it can be advantageous if, in a sorting method according to the invention, when the participant list is sorted, an end marking is placed at the end thereof. Such an end marking can itself be used as a participant, i.e. in particular the last participant. It forms a virtual indication of the end of an automoderation, as has already been explained. However, such an end marking can also be a participant, for example the moderator, who in conclusion presents the group of all of the participants with a summary of what has been said and carries out a transition to the normal video conference or terminates the video conference.

It is also advantageous if, in a sorting method according to the invention, the detected participant attributes include at least one random parameter allowing a random sorting of the participants. It should be pointed out that, after sorting on the basis of this random parameter, a fixation takes place so that no subsequent random change of the order can in fact take place. Such a random parameter serves in particular to allow different ordering options for always identical groups of participants in a video conference. In the language of automoderation, which is also known as playlist and autoplay, this can be referred to as "shuffle play". It is also possible that the random parameters correlate with stored parameters to ensure that different participants always open participant lists.

It brings further advantages if, in a sorting method according to the invention, at least one of the following participant attributes is detected:
time at which they joined the video conference,
role of the participant in the video conference,
function of the participant within a company.

The above list is non-exhaustive. Speaking time can also be a factor here. For example, participants with a longer speaking time can be placed first. It can also be taken into account who has which appointments scheduled for later, so that the maximum possible participation time in the video conference can be taken into account as a participant attribute. Of course, the use of multiple participant attributes, in particular in a weighted manner, is also conceivable in principle.

In addition, it may be advantageous if, in a sorting method according to the invention, during the fixing duration, at least one selected participant, in particular in the role of moderator of the video conference, can carry out an adjustment of the sorted and fixed participant list. In particular, this possibility of adjustment is limited to this moderator and this one selected participant. Preferably, no suspension of the fixation takes place, but an intervention in the fixed list. In this way, it becomes possible for the moderator to manually push individual participants forward in the fixation if they have to leave a video conference prematurely, for example.

The subject matter of the present invention also includes a computer program product comprising commands which, when the program is run on a computer, cause it to carry out a method according to the invention. Thus, a computer program product according to the invention brings the same advantages as those discussed in detail with reference to a sorting method according to the invention.

BRIEF DESCRIPTION OF THE SEVERAL VIEWS OF THE DRAWINGS

Further advantages, features and details of the invention are explained in the following description, in which exemplary embodiments of the invention are described in detail with reference to the drawings. The features mentioned in the claims and in the description may be essential to the invention individually or in any combination. In each case schematically:

DESCRIPTION OF SPECIFIC EMBODIMENTS OF THE INVENTION

Figure 1:
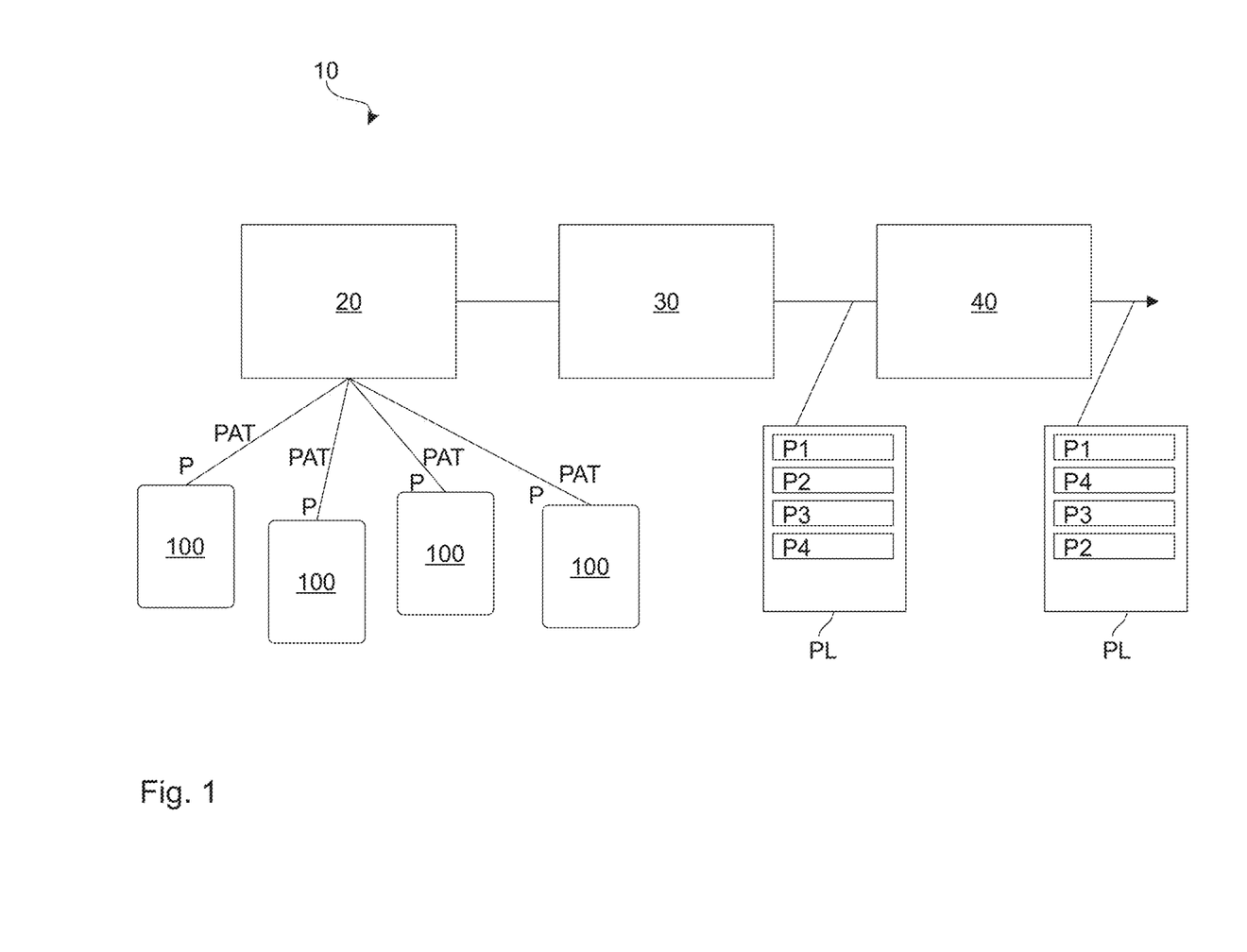
FIG. 1 shows an embodiment of a method according to the invention.

FIG. 1 shows schematically how the sorting method can take place with the help of a sorting device 10, which can for example be designed as a software application on a participant device 100. Represented schematically here are four participant devices 100 which are detected by a detection module 20 of the sorting device 10. In the simplest case, this can be done by dialling into a video conferencing system. For each participant device 100, the individual data of the participants P and the participant attributes PAT are detected and passed on. With the help of the generating module 30, a first participant list PL, in this case with four participants P (P1 to P4), is generated. The sorting module 40 is used to sort the individual participants P on the basis of their transmitted and detected participant attributes PAT, so that a sequence of participants P in the order P1, P4, P3 and P2 is formed here in this sorted participant list PL. In this sorted situation of the participant list PL, it is finally fixed and maintained for the course of the video conference, at least over the fixing duration FD, as will be explained later.

Figure 2:
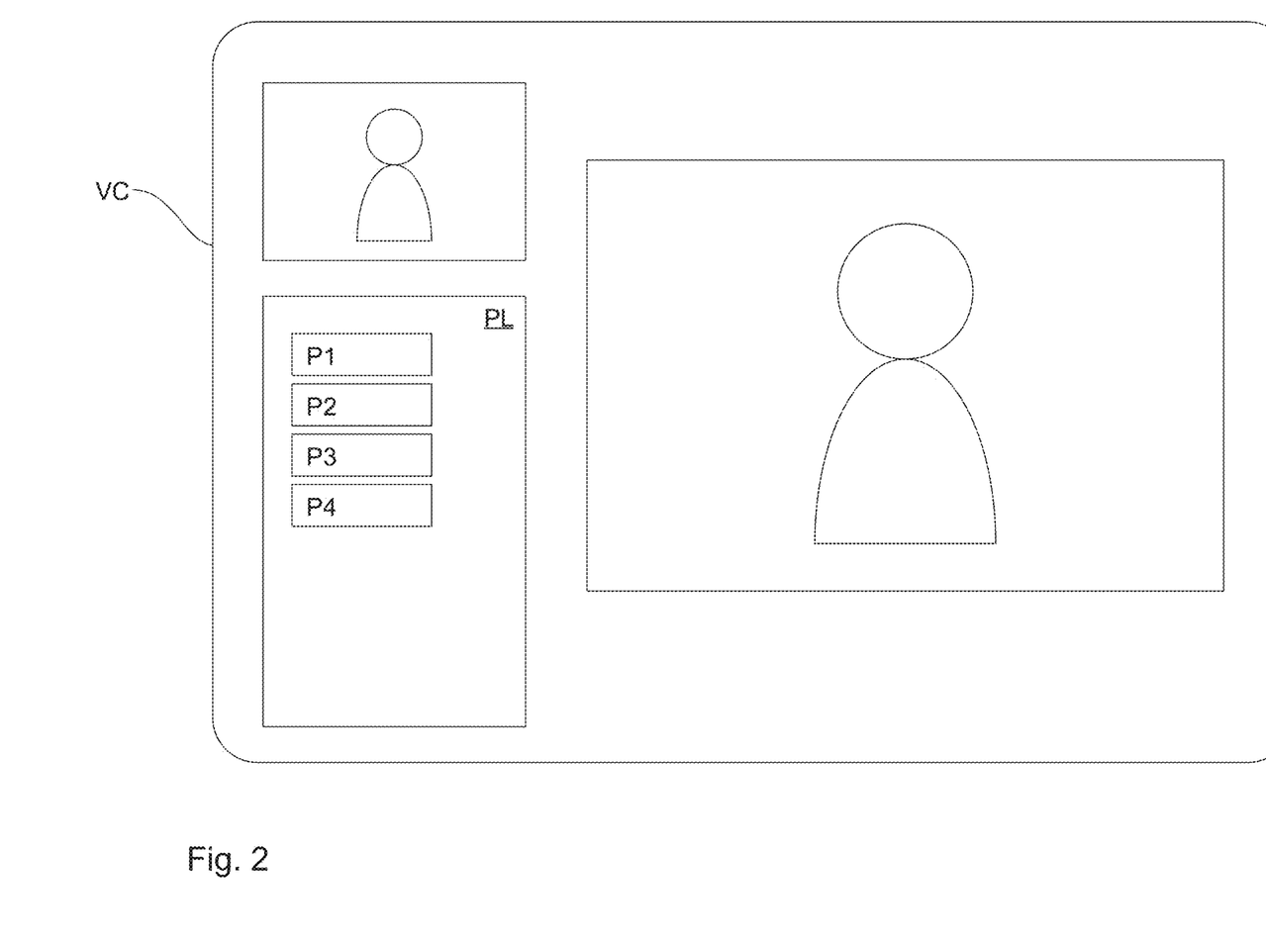
FIG. 2 shows a possible display on a participant device.
Figure 3:
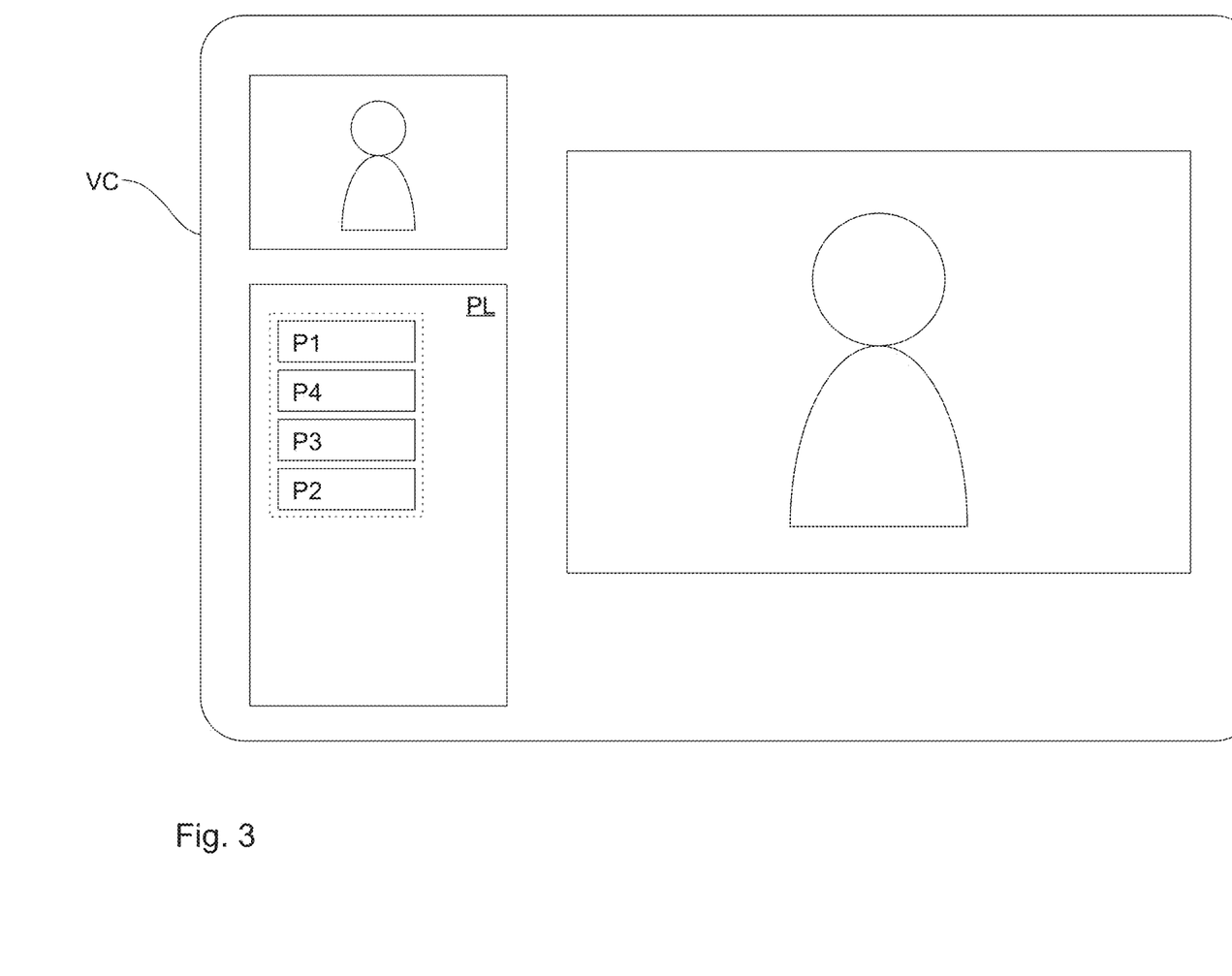
FIG. 3 shows another possible display on a participant device.

FIG. 2 shows an embodiment on a participant device 100 during the performance of a method according to FIG. 1. Here, the user of the respective participant device 100, as participant P, is displayed their own video image, represented schematically, at the top left. The large image shows, schematically, the currently active speaker of the video conference VC. Here, the participant list PL is still shown with the order of participants P1, P2, P3 to P4 based on the detection situation. If the sorting method now carries out the described sorting with the help of the sorting module 40 on the basis of the participant attributes PAT, then this results here in the sorted and, as indicated by the dotted line, fixed variant of the participant list PL with the order of participants P in the form P1, P4, P3 and P2, as shown in FIG. 3.

Figure 4:
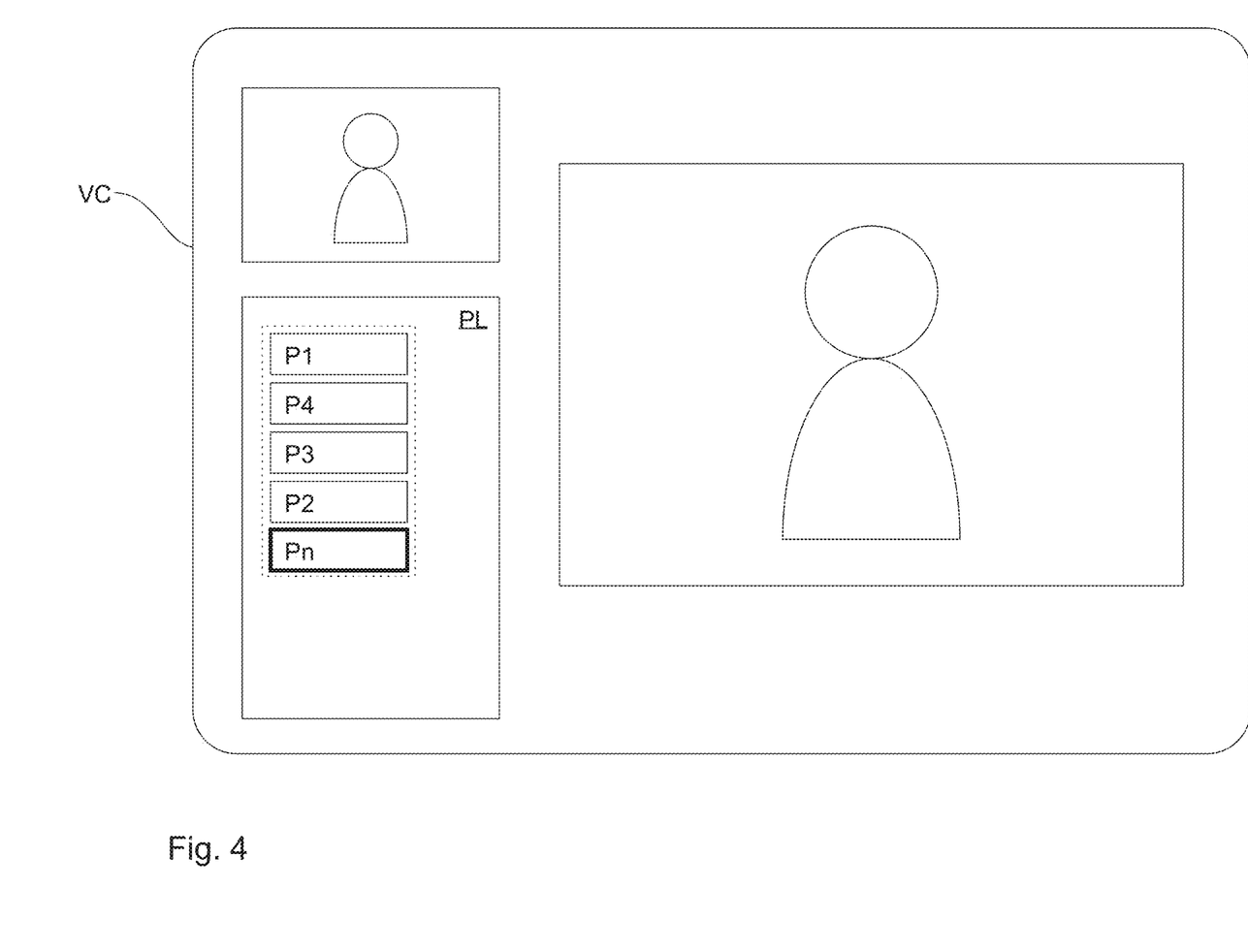
FIG. 4 shows another possible display on a participant device.

If the video conference VC is already taking place and a new participant Pn joins later, this can lead to a supplementation of the participant list PL, as shown in FIG. 4. In the embodiment according to FIG. 4, the new participant Pn is simply added to the end of the already sorted and fixed participant list PL and this is fixed again, as represented in FIG. 4 by the extended dotted border.

Figure 5:
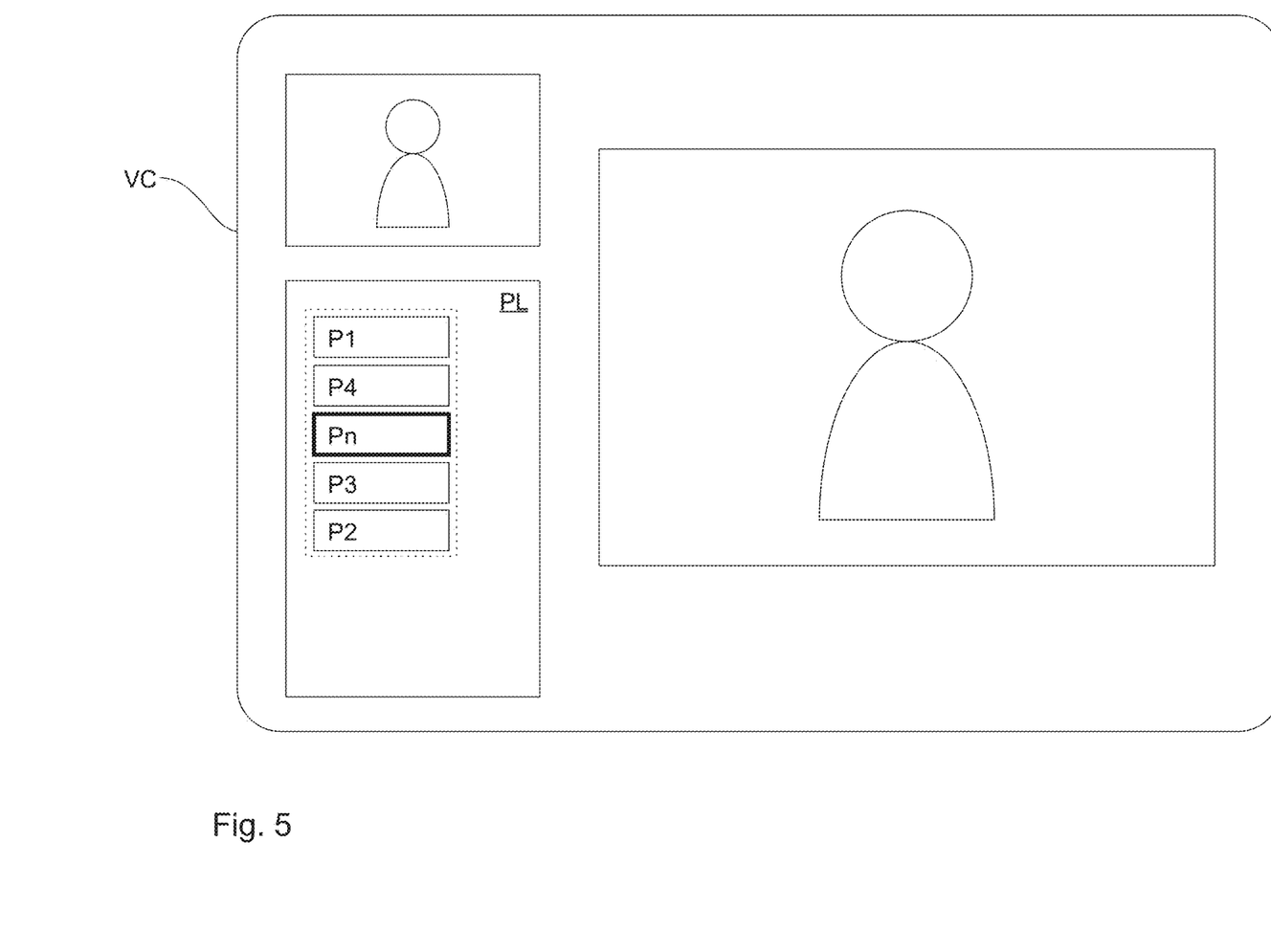
FIG. 5 shows another possible display on a participant device.

As an alternative to the embodiment according to FIG. 4, it is also possible to sort the new participant Pn into the participant list PL, for example based on their participant attributes PAT. Here too, this is followed by a repeated fixation of the participant list PL, which is also again expressed by the dotted border in FIG. 5.

Figure 6:
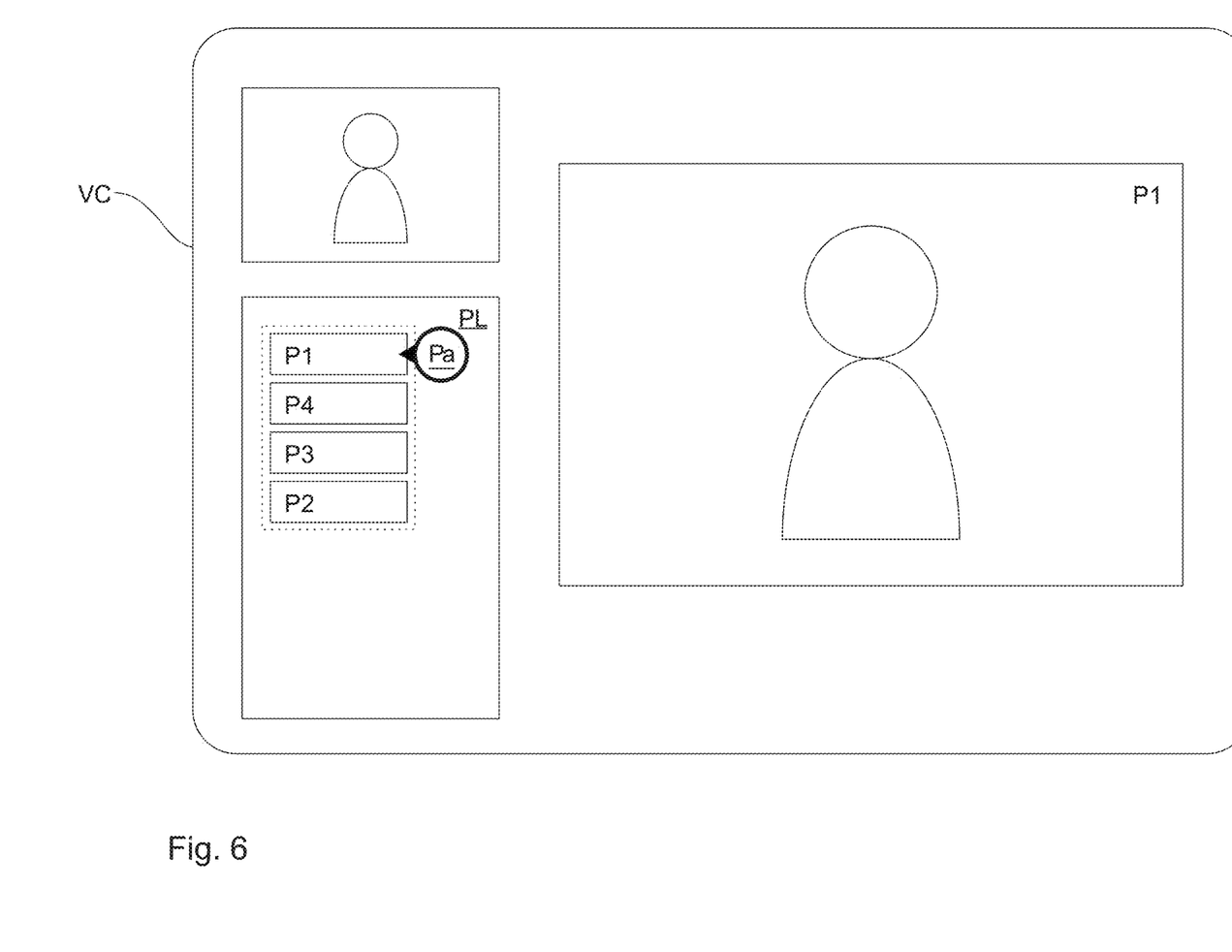
FIG. 6 shows another possible display on a participant device.
Figure 7:
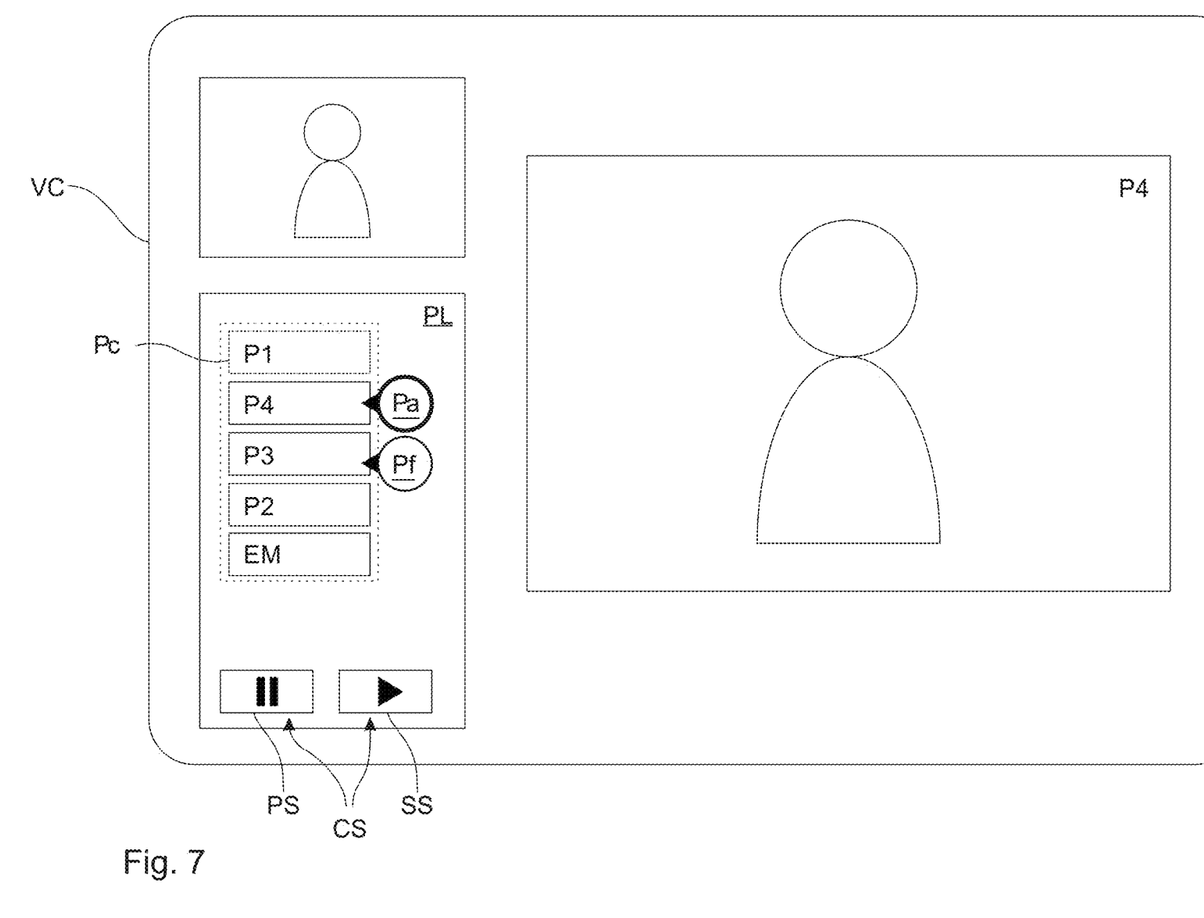
FIG. 7 shows another possible display on a participant device.

FIG. 6 shows a possibility of automatic moderation. Here, the participant P with the designation P1 is marked as the active participant Pa. Here, this marking is in particular displayed to all participants P and the participant P1 follows this marking as active speaker in the main screen of the video conference VC. As soon as this participant P1 has finished their activity, i.e. has shared their spoken contribution in the video conference VC, the marking of the active participant Pa in the fixed and sorted participant list PL is passed on in sequence to the next participant P, in this case P4. In the embodiment of FIG. 7, this situation is shown and thus the participant P4 can now be seen as the active participant Pa in the large display of the video conference VC.

FIG. 7 shows further additional marking options of the sorting method. The previous active participant Pa with the designation participant P1 is now marked as a concluded participant Pc. This shows that they had already delivered their spoken contribution. In addition, the later following participant P3, who according to the fixed and sorted participant list PL is next in line with their spoken contribution, is marked here as follow-up participant Pf.

In addition, FIG. 7 shows a further control possibility. During the ongoing operation of the automoderation of the video conferencing system of the video conference VC, a control signal CS in the form of a pause signal PS can be generated here using a corresponding button. In particular, this also pauses the already explained time signals or time periods which can be displayed. As soon as the participants P are again ready to resume the video conference VC, the automoderation can continue again with the help of the start signal SS as control signal CS.

Figure 8:
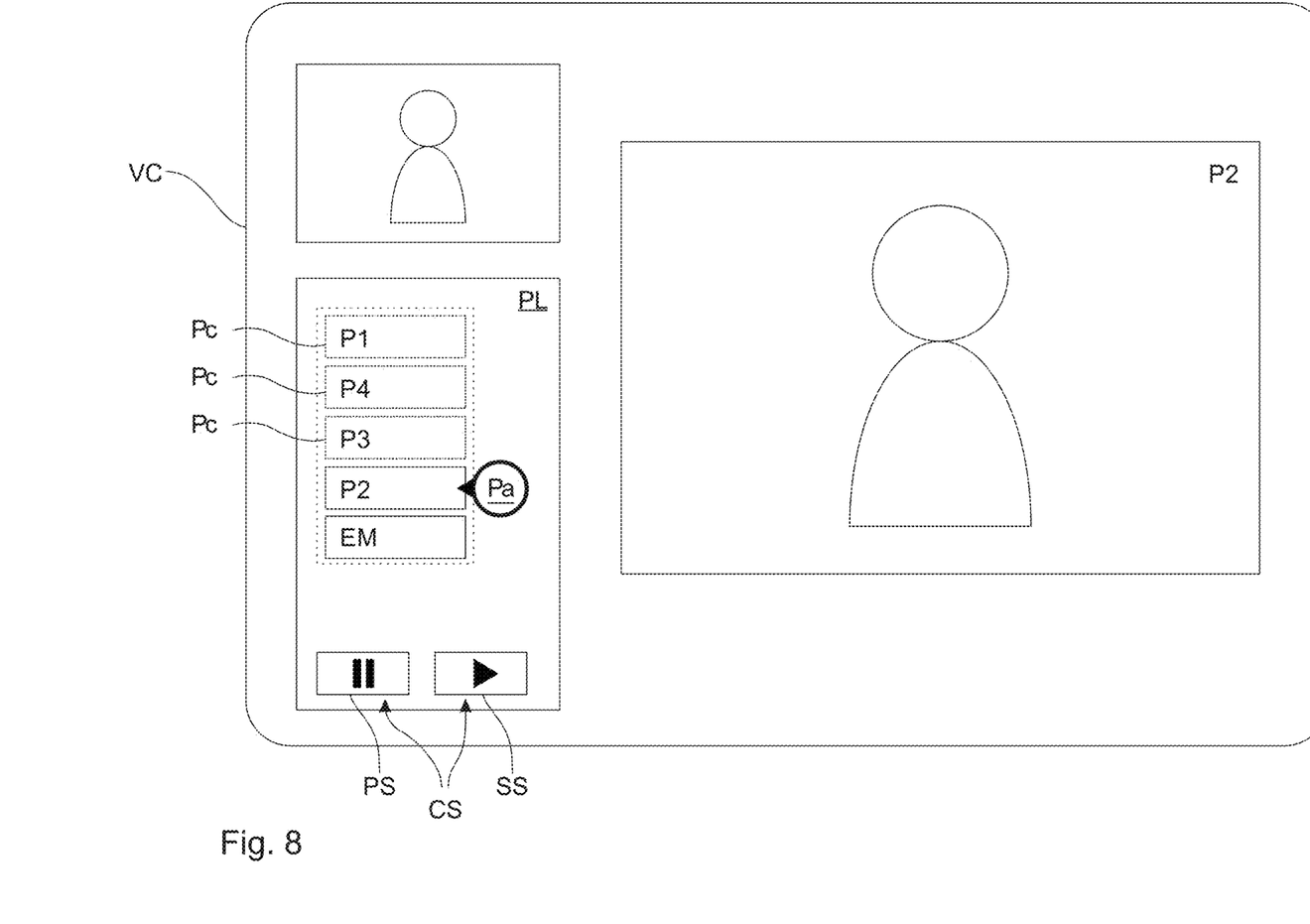
FIG. 8 shows another possible display on a participant device.

FIG. 8 shows a situation at the end of such an automoderation. Here, the last participant P2 is now selected as the active participant Pa. It can also clearly be seen that after this the video conference VC has reached the end of the automoderation, since the participant list PL is terminated here by an end marking EM.

Figure 9:
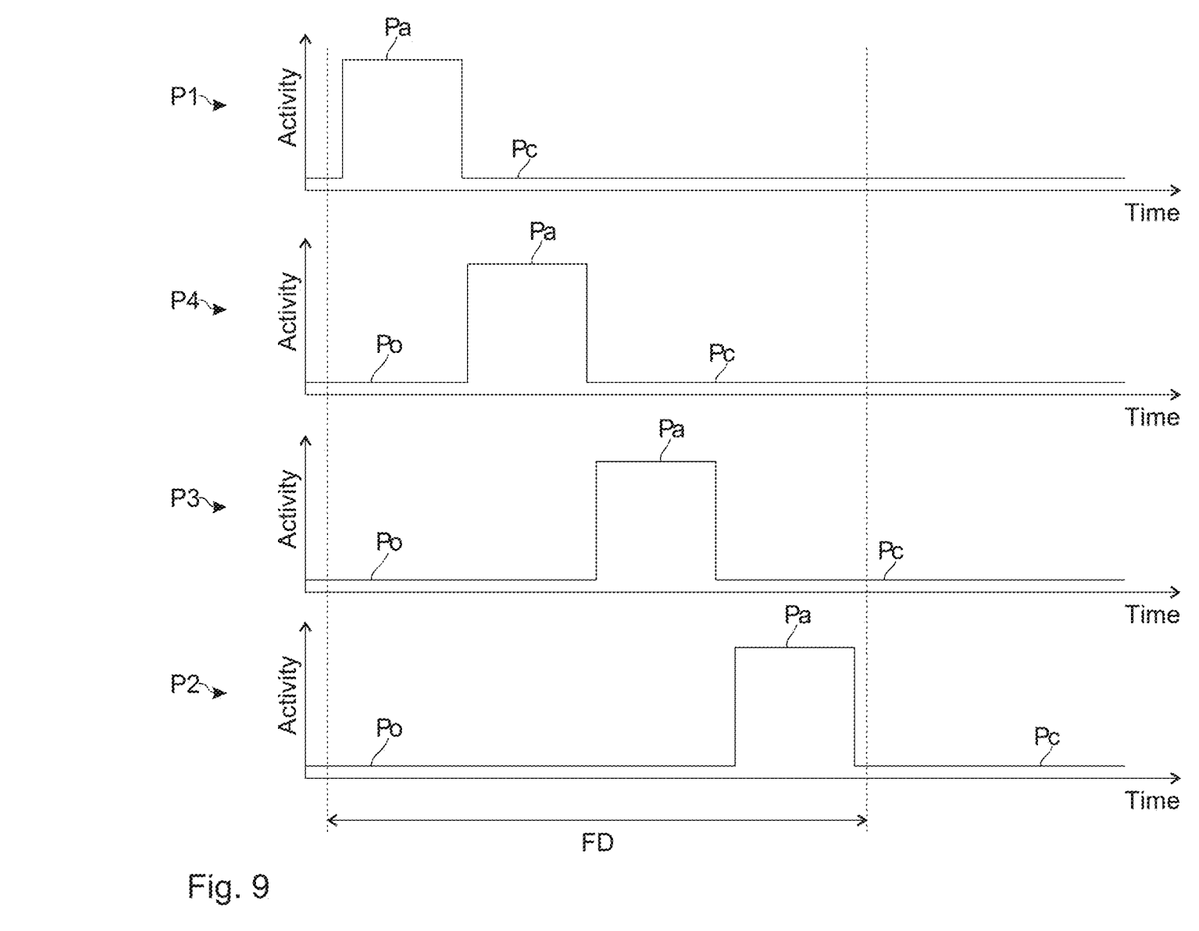
FIG. 9 shows a possible sequence for different participants on a participant list.

FIG. 9 shows a possibility of a schematic sequence of such a video conference VC. The individual participants P1 to P4 are shown here in more detail with regard to their activity over the timeline. All four participants P1 to P4 are expected to make their spoken contribution to the video conference VC over the fixing duration FD. In this case, this means that first of all the participant P1 is set as the active participant Pa and delivers their spoken contribution over a prespecified time. They will then be marked as a concluded participant Pc. During this transfer, in the order of the sorted participant list PL, the participant P4 is now marked as the active participant Pa, delivering their spoken contribution in the same way and then being marked as a concluded participant Pc. In the same way, this is continued for the participant P3 and finally for the participant P2, so that, to conclude the spoken contributions of all the participants P1 to P4, the fixing can be lifted by terminating the fixing duration FD. This can be the end of the video conference or it can lead to a continuation using a normal video conferencing system.

The above explanation of embodiments describes the present invention exclusively in the context of examples. Of course, individual features of the embodiments may, if technically expedient, be freely combined with each other without departing from the scope of the present invention.

LIST OF REFERENCE SIGNS 10 sorting device
20 detection module
30 generating module
40 sorting module
100 participant device
VC video conference
PL participant list
EM end marking
P participant
Pn new participant
Po open participant
Pa active participant
Pf follow-up participant
Pc concluded participant
PAT participant attribute
FD fixing duration
CS control signal
PS pause signal
SS start signal

The invention claimed is:

1. Sorting method for sorting a participant list-(PL) comprising participants of a video conference, comprising:
    detecting all of the participants of the video conference;
    detecting at least one participant attribute for each detected participant;
    generating a participant list of all of the detected participants;

sorting the participant list on the basis of the detected participant attributes; and fixing the sorted participant list at least for a fixing duration over the continuation of the video conference;

marking at least one participant in the sorted and fixed participant list as active participant successively in an order of marking, wherein the order of marking as active participant corresponds to the sorted and fixed participant list;

wherein, if new participants are detected after the sorted participant list has been fixed and after the marking of the at least one participant as active participant has begun, the sorting method comprises:

sorting the detected new participants into the sorted participant list at sorting positions of the sorted participant list on the basis of their detected at least one participant attribute to form a supplemented participant list;

checking if the sorting positions at the time of forming the supplemented participant list are arranged after the respective sorting position of the active participant;

forming the supplemented participant list at least with respective sorting positions from the sorting positions that at the time of forming the supplemented participant list are arranged after the respective sorting position of the active participant; and fixing the formed supplemented participant list at least for the fixing duration.

2. Sorting method according to claim 1, wherein if new participants are detected after the sorted participant list has been fixed, these detected new participants are added to the sorted participant list at the end in order of the time of joining to form a supplemented participant list and the supplemented participant list is fixed again at least for the fixing duration.

3. Sorting method according to claim 1, wherein if new participants are detected after the sorted participant list has been fixed, these detected new participants are sorted into the sorted participant list on the basis of their detected at least one participant attribute to form a supplemented participant list and the supplemented participant list is fixed again at least for the fixing duration.

4. Sorting method according to claim 1, wherein in the sorted and fixed participant list, one of the participants, who is next to be marked as the active participant, is marked as follow-up participant.

5. Sorting method according to claim 1, wherein together with the marking as active participant, an audio transmission for the at least one participant marked as active participant is activated.

6. Sorting method according to claim 1, wherein before being marked as active participant, the at least one participant to be marked receives a marking query.

7. Sorting method according to claim 1, wherein the marking of the active participant includes a continuous time display.

8. Sorting method according to claim 1, wherein after a participant was marked as active participant, the participant is marked as a concluded participant.

9. Sorting method according to claim 1, wherein at least one control signal is detected, wherein based on a pause signal as the detected control signal, the marking of a participant, who is next in the order of marking, as active participant is blocked.

10. Sorting method according to claim 1, wherein the participants marked as active participants are assigned different audio parameters based on their order in the sorted and fixed participant list.

11. Sorting method according to claim 1, wherein when the participant list is sorted, an end marking is placed at the end thereof.

12. Sorting method according to claim 1, wherein the detected participant attributes include at least one random parameter for allowing a random sorting of the participants.

13. Sorting method according to claim 1, wherein the detected participant attributes comprise at least one or more of:

time at which the participant joined the video conference, role of the participant,
function of the participant.

14. Sorting method according to claim 1, wherein during the fixing duration, at least one selected participant, is enabled to adjust the sorted and fixed participant list.

15. A system, comprising
a processor, and
a memory coupled to the processor and storing instructions that, when executed by the processor, cause the processor to:
detect all of the participants of the video conference;
detect at least one participant attribute for each detected participant;
generate a participant list of all of the detected participants;
sort the participant list on the basis of the detected participant attributes;
fix the sorted participant list at least for a fixing duration over the continuation of the video conference;
mark at least one participant in the sorted and fixed participant list as active participant successively in an order of marking, wherein the order of marking as active participant corresponds to the sorted and fixed participant list;
wherein, if new participants are detected after the sorted participant list has been fixed and after the marking of the at least one participant as active participant has begun, the processor is configured to:
sort the detected new participants into the sorted participant list at sorting positions of the sorted participant list on the basis of their detected at least one participant attribute to form a supplemented participant list;
check if the sorting positions at the time of forming the supplemented participant list are arranged after the respective sorting position of the active participant;
form the supplemented participant list at least with respective sorting positions from the sorting positions that at the time of forming the supplemented participant list are arranged after the respective sorting position of the active participant; and
fix the formed supplemented participant list at least for the fixing duration.

16. Sorting method according to claim 9, wherein the marking of the participant, who is next in the order of marking, as active participant is blocked until a start signal is detected as the control signal.

17. Sorting method according to claim 1, wherein the at least one participant attribute corresponds to the participant and is not the time at which the participant joined the video conference.

18. Sorting method according to claim 1, wherein together with the marking as active participant, a respective audio transmission is activated for the participants marked as active participant, wherein the active participants are assigned different audio parameters based on their order in the sorted and fixed participant list, wherein the audio parameters correspond to audio signals for the respective audio transmission.

* * * * *